Dec. 3, 1940.    E. J. CEDERBERG    2,223,782
SAW SETTER AND FILER
Filed June 29, 1938    4 Sheets-Sheet 1

INVENTOR
Ernest J. Cederberg
BY Richards & Geier
ATTORNEYS

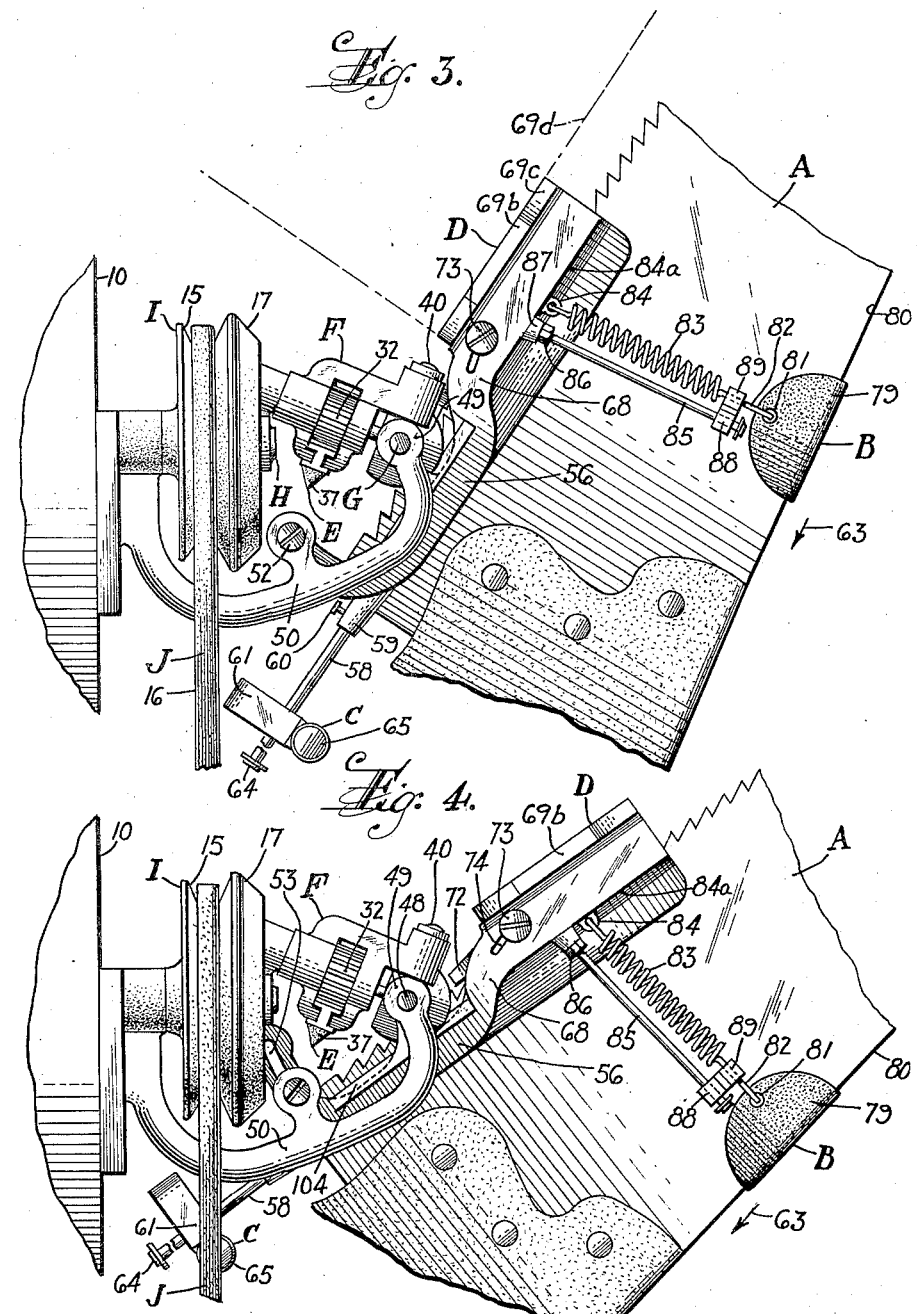

Dec. 3, 1940.  E. J. CEDERBERG  2,223,782
SAW SETTER AND FILER
Filed June 29, 1938  4 Sheets-Sheet 3
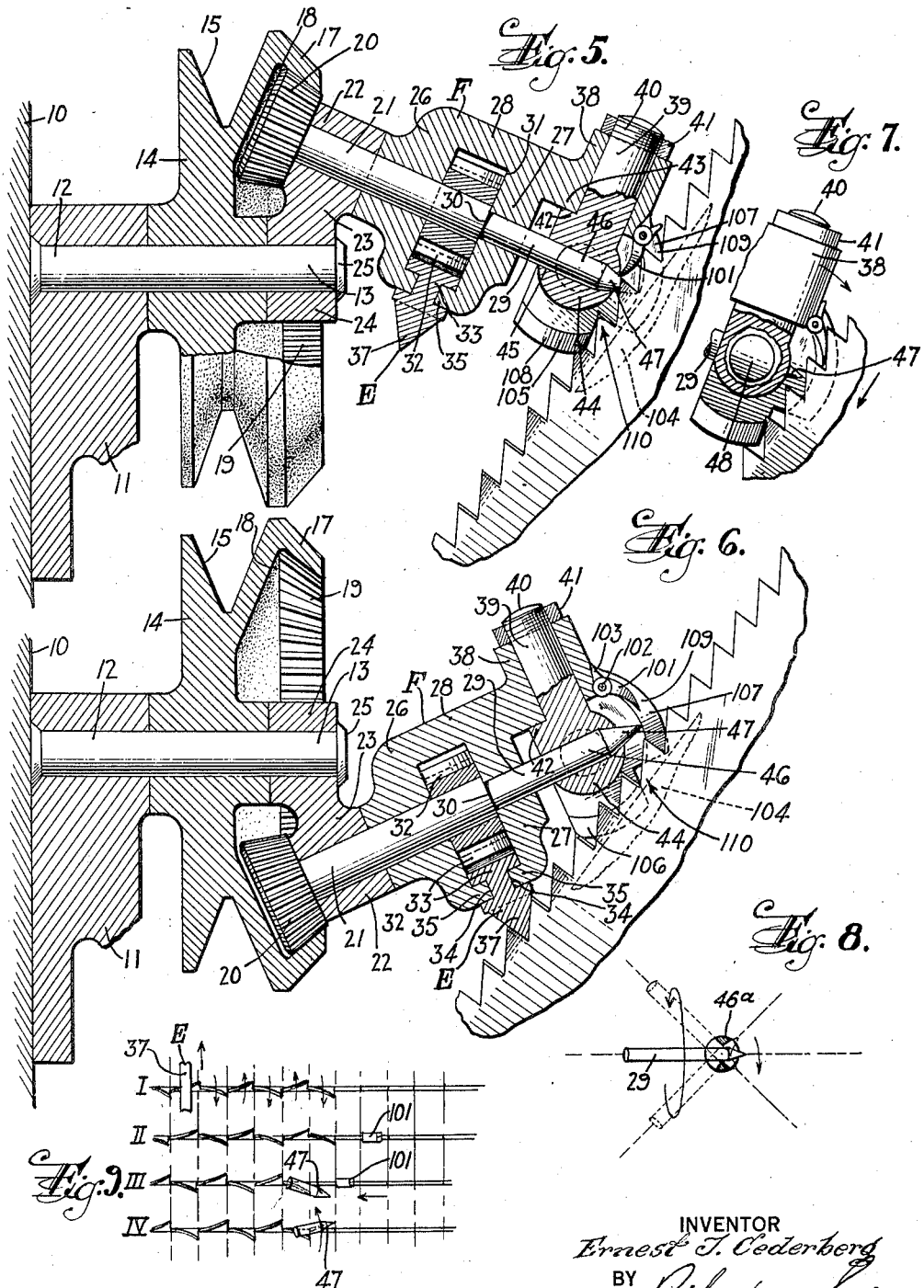

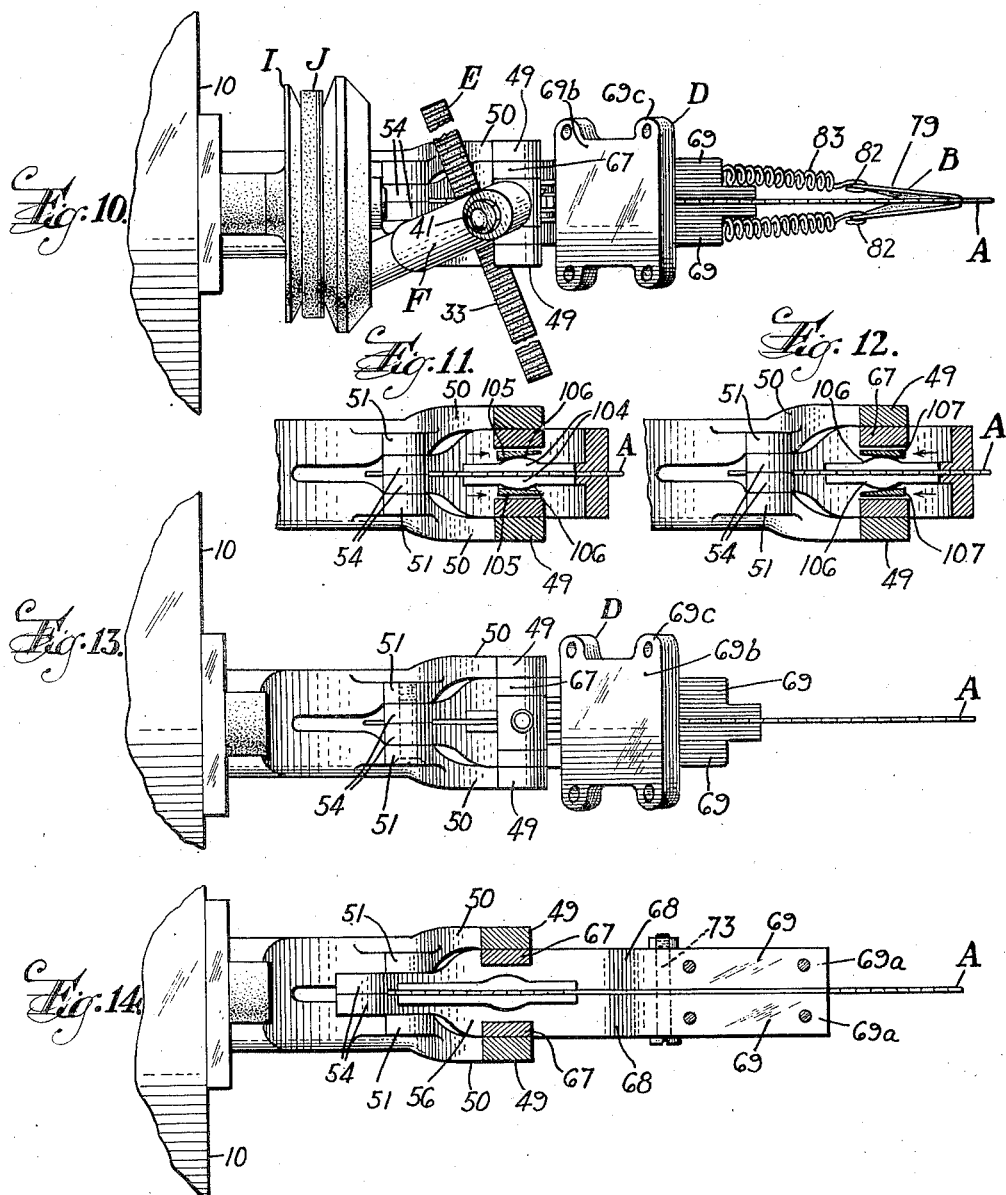

Patented Dec. 3, 1940

2,223,782

UNITED STATES PATENT OFFICE 2,223,782

SAW SETTER AND FILER

Ernest J. Cederberg, Caldwell, N. J., assignor to Richard I. Wood, Caldwell, N. J.

Application June 29, 1938, Serial No. 216,495

11 Claims. (Cl. 76—31)

The present invention relates to a saw setting and filing device and it is also broadly applicable to machines and mechanisms where an alternating reciprocatory movement is to be given to a working tool.

In setting and filing saws, considerable difficulty is experienced due to the fact that the setting device and the file are differently applied to each tooth, during the normal manual operation with the result that the sharpness and angle of the tooth will vary over the length of the saw even though skilled and experienced operators be employed.

Moreover, a considerable amount of time and labor by skilled highly paid operators is required in setting and sharpening saws with the result that often the saws are permitted to become quite dull and mis-set before a sharpening and setting thereof.

It is, therefore, among the objects of the present invention to provide an improved saw sharpening and setting device, which may be accurately, rapidly and efficiently operated to sharpen a saw with a minimum of manual labor or automatically without manual labor and which will give assurance of uniform sharpness and angle to each of the teeth of the saw after the setting and sharpening operations have been completed.

A further object of the present invention is to provide an improved automatic or semi-automatic tool construction adapted for setting and sharpening saws and for other purposes in which a file, abrader or other reciprocatory tool element is to be applied to an object at intervals thereon to give a suitable treatment.

Other objects will be obvious or will appear during the course of the following specification.

In accomplishing the above objects, it has been found most satisfactory, according to one embodiment of the present invention to provide a reciprocatory carrier for a file or other instrument which may be driven by a rack and pinion arrangement carried by an oscillating yoke, collar or mount.

This oscillating collar or mount may be driven about a central shaft by means of a bevelled gear arrangement, which may be adjusted so that the alternate strokes of the tool may be caused to take place in the same direction or at varying angles to each other.

In one form of the construction, the yoke or carrier for the rack and pinion has a pivotal connection at one end coinciding with the pivotal mount of a main bevel gear, preferably an internal ring gear, and has a universal connection at its other end. The pinion of the oscillating yoke may be mounted on an obliquely positioned shaft.

Meshing with the main bevel gear is a smaller gear mounted on the carrier and on said oblique shaft which is adapted to be swung backwardly and forwardly upon operation of the machine and then to drive the oblique shaft and the pinion and rack at the limit of its oscillating movement.

The end of this shaft may be caused to swing across the teeth to set them in connection with the sharpening or between sharpenings.

The bevel gear is preferably connected to a pulley which in turn is designed to be actuated from a source of reciprocating power or by hand if desired.

In the drawings are shown one of the various possible embodiments to which the invention is by no means restricted, the drawings being merely by way of illustration and not by way of limitation.

In the drawings:

Figure 3 is a side elevational view similar to Figure 2 with the file moved away from the teeth of the saw, showing the adjustment of the file in Figure 3 being designed to produce a sharpening effect for a rip saw with a straight backward and forward movement of the file across the teeth.

Figure 4 is a side view similar to Figure 3 with the file moved away from the teeth of the saw, showing a different adjustment of the file in which the file is to be used sharpening a cross cut saw with an angle of about 22½°.

Figures 5 and 6 are respectively cross sectional views illustrating different positions of the file and of the spindle carrying the rack and pinion drive, Figure 5 being the setting position with the file withdrawn from the teeth and Figure 6 showing the file applied to the teeth.

Figure 7 is a fragmentary transverse sectional view of the universal joint construction.

Figures 8 and 9 are diagrammatic views, Figure 8 illustrating the variation in position of the spindle of the oscillating rack carrying device during operation, and Figure 9 illustrating the cycle of sharpening a tooth, advancing a tooth, and setting a tooth.

Figure 10 is a top view of the device with the file applied to the teeth.

Figures 11 and 12 illustrate the clamping construction and the manner in which it is actuated at different points in the cycle.

Figures 13 and 14 are top and bottom views of the construction showing the saw carrier arrangement.

Figures 1, 2:
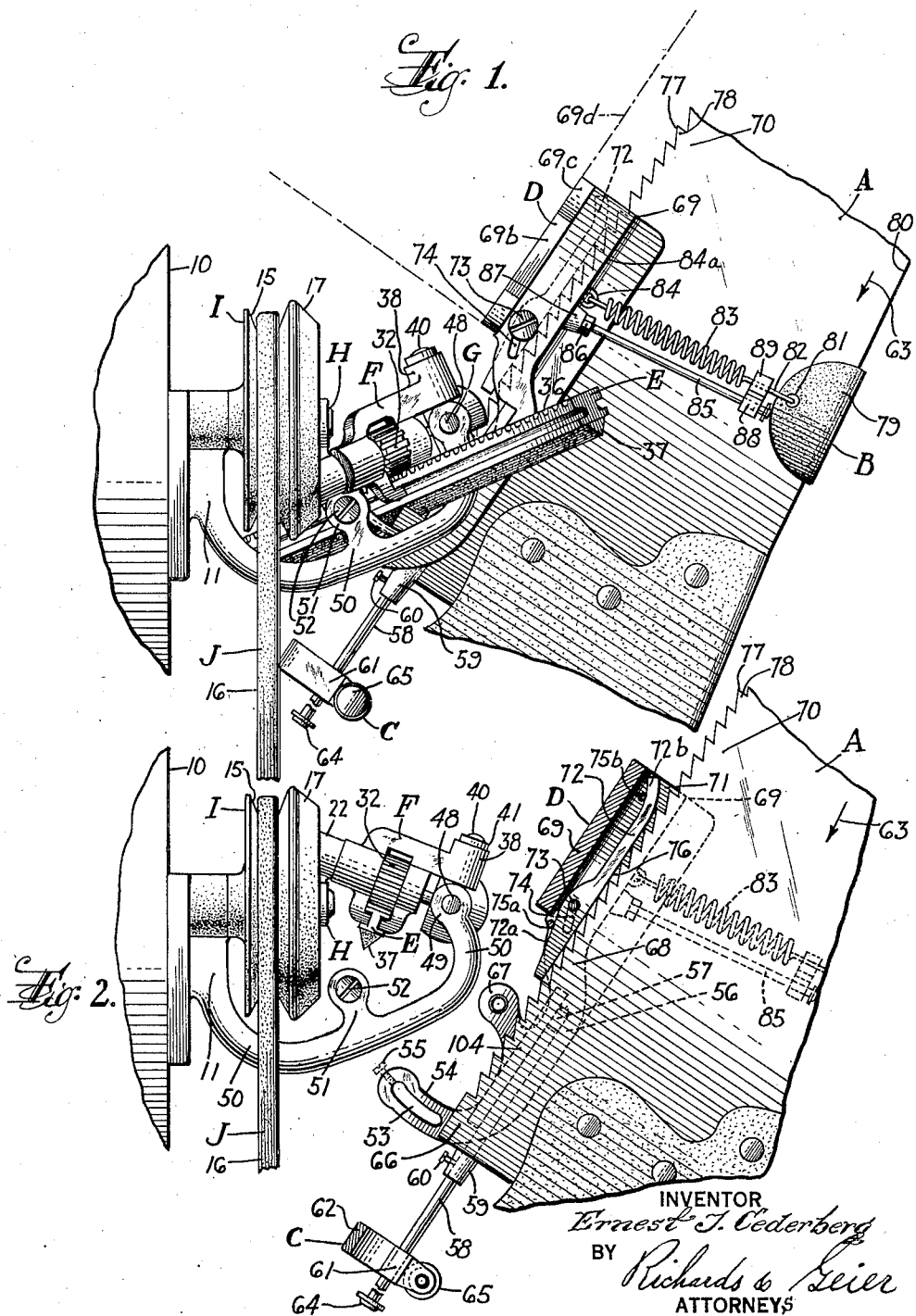
Figure 1 is a side view of the sharpening and setting apparatus showing part of the saw construction in position, with the file applied to one of the teeth.
Figure 2 is a separated view of the sharpening and setting apparatus in which the saw carrier is removed from the assembly of Figure 1 so as more clearly to show its construction with the file moved away from the teeth of the saw.

Referring to the drawings, (Figures 1 to 6), a saw A is indicated as being held in position by the holder construction B, C, in the guide member D. A reciprocatory device E is carried by the structure F having a universal mount G and a pivotal mount H.

The driving structure I is actuated by the belt J from some suitable power source (Figures 1 to 4).

Referring specifically to the driving structure, as best shown in Figures 5 and 6, a wall or other support 10 carries the bracket 11 and which bracket in turn carries the fixed shaft 12. The projecting end 13 of the shaft 12 carries the pulley member 14 having a groove 15 to receive the belt J (see also Figures 1 to 4).

The belt 16 may be connected to any suitable source of reciprocatory power, or, if desired, the pulley 14 might be replaced by a gear which would give an alternating backward or forward or oscillating movement by a pinion or other guiding means.

Instead of the bracket 11, the holder mechanism might be placed upon a bench or a suitable clamp or mounting device with the main shaft 13 in other positions than the horizontal position, as shown.

It is often desired to turn the mechanism in such a manner that the shaft 13 will be substantially vertical so that the saw will be held in the holder D by the gravity without holders B and C.

In the structure as shown (referring particularly to Figures 5 and 6), the side of the pulley 14 is provided with an extension 17 having a recess 18, the interior face of which is provided with gear teeth 19 to form an internal bevel gear.

The internal bevel gear meshes with the bevel pinion 20, which is fixed upon the shaft 21. The shaft 21 is mounted in the bearing eye 22. The bearing eye 22 is carried by the arm 23, which at its other end is provided with a collar 24 rotatably mounted on the end 13 of the shaft 12.

The end of the shaft 13 is provided with a head 25 to hold the leg 23 and bearing collar 24 in the position thereon.

The shaft 21 extends through the arms 26 and 27 of the yoke 28 forming part of the swinging or oscillating structure F.

The extension 29 of the shaft 21 is of reduced diameter, the shoulder 30 at the end of said portion 29 being positioned at the inside face 31 of the clevis element or arm 27.

Fitted upon the shaft 21, to turn with the shaft, is the pinion 32.

The pinion 32 meshes with the rack 33 which is provided with the recessed portions or grooves 34 receiving the inturned lips 35 from the ends of the clevis members or jaws 26 and 27 of the structure F. These guide the rack 33 in its reciprocating movement and maintain the engagement of the rack 33 and the pinion 32.

The outer face of the rack structure 33 carries the triangular file 37, which file may be suitably locked or otherwise attached to the ends of the rack structure E.

It is apparent that other reciprocatory devices may be utilized in lieu of the triangular file 37.

In the preferred construction, the teeth of the triangular file are turned in opposite directions on different sides of the center of the file and the width and size of the file increases gradually toward the central portion thereof so that the abrading action will increase as the file is drawn from its end portion along the teeth of the saw until its middle portion whereupon there will be no abrasion for the remainder of the stroke of the file, one application of the file should completely sharpen two tooth shanks.

By controlling the size and shape of the file, the abrading action, of course, may be suitably adjusted.

The yoke structure 28 is also provided with an integral sleeve 38 having an axis transverse to the axis of the shaft 21 receiving the shaft 39 forming part of the universal G.

The shaft 39 is held in position by the lock nuts 41 screwed into the reduced diameter threaded portion 40 and the shoulder 42 which abuts against the end face portion 43 of the sleeve 38. The end portion 44 of the shaft 39 is provided with an eye 45 which receives the end extension 46 of the reduced diameter portion 29 of the shaft 21. The element 46 terminates in the point 47. As shown in Figure 8, the eye has two portions 46a upon which the extension 46 pivots as it swings backwardly and forwardly between the dotted line positions.

The portion 44 is provided with outwardly extending studs 48 (see also Figures 1 to 4 and 7) which studs fit in the eyes 49 at the end of the yoke structure 50. The yoke structure 50 is rigid or integral with the mounting structure 11.

The intermediate portions of the double yoke 50 are provided with the upwardly extending eye members 51 which receive a bolt 52 extending through the slots 53 in the inner ends 54 of the structure 56 forming a part of the structure D (see particularly Figures 2 and 13). The bolt 52 is designed to clamp the eyes 51 and 54 in predetermined position.

Adjustment of the bolt 52 to different positions in the slot 53 will vary the angle of the cut of the file 37 when the bolt 52 is in the top of the slot 53, the file 37 will be in straight or rip-saw sharpening position. When the bolt 52 is in the bottom of the slot 53 the file 37 will be in cross cut sharpening position and will cut at an angle say of 22½°.

The portions 54 carried in the structure 56 are provided with the adjustment screw 55. The screw 55 acts as a stop to limit the swinging movement of the structure F by abutting the arm 23. Adjustment of the screw 55 will increase or decrease the cut taken by the file 37.

The extensions 56 of structure D are positioned between the yokes 50 (see also Figures 11 to 14), one of the elements 56 has a recess 57 receiving the rod 58 (see Figure 2) which is held in position in the stud 59 by the set screw 60.

The rod 58, at its outer end, extends through and slides in the eye portion 61 of the yoke 62. The yoke 62 may slide along the rod 58 until it is stopped by the enlargement or head 64 at the end of said rod 58. The device C is only utilized when the left end portion 66 of the saw A has moved substantially to the left beyond the position shown in Figures 1, 3 and 4, and when the saw has moved to this position, the end 66 thereof may be positioned between the arms of the yoke 62 and the screws 65 may be tightened against said saw A. When this occurs, the yoke 62 will move with the saw A until it strikes the head 64 at the end of the rod 58. The screw or turning clamp members 65 will then retain the yoke 62 on said saw A when it is moved in the direction 63 (see Figures 1 and 2). The portion 66 of said saw A is received in said clamp and between the jaws of said clevis or yoke 62.

The eyes 67 in the structures 56 (Figures 2 and 10 to 14) are received upon the studs 48 of the element 44 of Figures 5 and 7. The arms 68 constitute continuations of the structures 56 and terminate in the spaced members 69 (see particularly Figures 1 and 2).

The members are riveted or otherwise connected by the elements 69a to the back plate 69b having the attachment ears 69c. These attachment ears 69c might be bolted to the bench 69d, indicated by dot and dash lines in Figures 1 and 3, if desired. The bench 69d is used only when the machine is hand operated. When power is employed, the bracket 11 is used to support the pulley L in alignment with the motor. It is apparent that when either support 10, 11 or support 69d is employed, it will be possible to adjust the slot 53 in respect to the bolt 52.

Into the space or slot 71 between the members 69a, the edge 70 of the saw A is inserted or received (see Figure 2). Within the slot 70 is the adjustable contact member 72 carrying a pin or bolt 73 received at its ends in the slots 74 in the enlarged portions 75 of said elements 69. As indicated in Figures 1 and 2, the face 76 of said member 72 contacts the ends 77 of the teeth 78 of the saw A.

The sloping or inclined upper faces 72a and 72b of the element 72 engage and contact the pins 75a and 75b. When the bolt 73 is loosened and the element 72 moved to permit the teeth of the saw A to move inwardly toward the file 37, or outwardly to reduce the cut of the file 37, the guide pins 75a and 75b will assure that edge 76 will always assume a parallel position to the direction 63. The saw A is carried by the folded leather or other element 79 into which fits the straight back edge 80 of the saw A. The folded element 79 has openings at 81 which receive the ends 82 of the coil spring 83. The coil springs 83, at the other end, are engaged with the eyes 84 on the shoulders 84a of the structure D.

The structure D also carries the rods 85 which are fixed in position by the lock nuts 86 and the upstanding projections 87. The rods 85 carry the sliding guide elements 88, which at their other sides 89 engage extensions 82 of the springs 83.

Where the apparatus is inclined so that the saw will bear down by its weight into the guides, the various holding devices B, C and D may be omitted.

To cause the teeth of the saw to advance after each setting and sharpening operation has been completed, a pawl 101 is provided pivotally mounted at 102 and having a stop extension 103, as best shown in Figures 5, 6 and 7.

As shown in Figure 9 the pawl 101 will function after the filing operation I and before setting operation III—IV. In Figure 5, the file 37 is shown in withdrawn position, and the pawl 101 has advanced the saw A one tooth. The setting element 47 is about to sweep over and set the tooth upon which the pawl 101 has acted. When both the pawl 101 and setting element 47 are moved out of position in Figure 6 and the file 37 applied, it will be noted that it is applied to a tooth, several teeth beyond that tooth just acted on by the pawl 101 and setter 47.

To hold the saw in position during the sharpening operation, two clamp elements 104 are provided to hold the saw in position during the application of the file, these clamp elements being best shown in Figures 11, 12 and 14.

The cam elements 105 and 107 of the structure 44 (see Figures 5 and 6) are designed to ride over the bosses 106 and press the jaw members 104 against the saw A in the manner best shown in Figures 11 and 12 between the applications of the pawl 101.

It will be noted that the clamp actuators 105 and 107 extend outwardly from and swing with the element 44 and that bevels 108 and 109 approach each other, as indicated in Figures 11 and 12, away from the open space 110 (see Figures 5 to 7).

Between the actuators 105 and 107, the pawl 101 will advance the saw A one tooth, at a position corresponding to the open space 110, or operations II and III of Figure 9.

In operation, the saw A is placed in position in the holders B, C, D as indicated in Figures 3 and 4, and then oscillating force is applied automatically or manually to the pulley 15 through the belt 16.

In the position, as shown in Figure 3, the file 37 will be alternately elevated away from the saw as it is advanced one tooth by the pawl 101 and when the setting element 47 is applied to a tooth (operations II to IV of Figure 9) and then the file is lowered into the position of Figure 6 and drawn along the tooth (operation I of Figure 9).

The structure F, together with the shaft 21—29 and the point 47 will be swung from the right to the left in the manner indicated in Figure 8, as the gear 17 drives the gear 20 upon the shaft 12 and the universal structure G until the arm 23 meets the stop screw 55. During this swinging movement the shaft 21—29 will not rotate.

The end of file 37 at the end of this movement will be in contact with a saw tooth. Thereafter further movement of the gear element 18 will drive the pinion 20 and cause rotation of the shaft 21—29 and reciprocating movement of the file 37 across the saw tooth (operation I of Figure 9).

The swinging movement of the structure F together with the shaft 21 and the file 37 will permit changing position of the file so that it will be properly presented to successive teeth of the saw A.

When the shaft 21—29 commences to turn driving the rack structure and file E, the file will be in position to sharpen the teeth as the forward end of the file 37 is drawn therethrough.

As soon as the file is completely drawn across the tooth, the oscillating movement then reverses causing the pulley 15 then to swing the structure F in the reverse direction. The file 37 will be elevated away from the saw A and the pawl 101 and the setter 47 will be successively applied to advance the saw a tooth and to set a tooth in advance of the tooth being sharpened. Then the other end of the file will be applied to and drawn across the next teeth after the one previously sharpened. These successive operations are indicated in Figures 8 and 9.

In the adjustment shown in Figure 3, the file is drawn straight way across the tooth while in the adjustment shown in Figure 4, the file is drawn at an angle of 22½°.

The position of Figure 3 is most suitable for sharpening a straight cut or rip saw, whereas the angle shown in Figure 4 is most suitable for sharpening a cross cut saw.

This adjustment may be readily obtained by varying the position of the bolt 52 in the slot 53, as shown in Figures 3 and 4. The straight position is attained by placing the bolt in the outer portion of the slot 53 while the cross cut position is obtained by placing the bolt in the inner portion of the slot 53.

It is apparent that many other adjustments may be utilized and that the reciprocating movement attained at the device E may be utilized for other purposes than sharpening saws.

The important feature of the present invention resides in the fact that by means of a tool to apply a series of cuts or friction applications to an instrument which may be a saw or some other device with advance of the instrument by predetermined distance between each application. Instead of an internal bevel gear 19, a set of outside gears may be employed. It is important that the file 37 be drawn across the teeth so that there is no burr on the cutting edges and this is accomplished in the present embodiment by the combination of an internal bevel gear and a bevel pinion.

It is apparent that the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

1. A machine comprising a support, a main fixed frame mounted on said support, said main frame having two separated pivotal mounts, a swinging secondary frame carrying a reciprocatory tool mounted at said pivotal mounts on said main frame, said secondary frame carrying a shaft, a driving gear mounted on the main frame adjacent one of said pivotal mounts, a driven gear mounted on the adjacent end of the shaft of the secondary frame, a pinion mounted on an intermediate part of said second shaft, and the other end of the second shaft extending toward and terminating adjacent the other of said mounts, a rack carrying said tool also mounted for sliding movement on said secondary frame and meshing with said pinion.

2. In the machine of claim 1, a holder for an object to be worked on and means to clamp said object when worked on by said tool.

3. In the machine of claim 1, a universal joint being provided at said second pivotal mount.

4. In the machine of claim 1, said second shaft being obliquely disposed in respect to said first shaft.

5. A machine comprising a support frame having a central shaft and an outstanding arm, a gear mounted on said shaft, an oscillating arm mounted on said shaft, a gear carried by said oscillating arm meshing with said first mentioned gear, a shaft carried by said second gear, a frame carried by said second shaft, a universal mount for the end of said second shaft away from said second gear carried by said outstanding arm, a reciprocating tool carried by said second frame, a clamp carried by said outstanding arm to carry an object to be worked on.

6. A machine comprising a support frame having a central shaft and an outstanding arm, a gear mounted on said shaft, an oscillating arm mounted on said shaft, a gear carried by said oscillating arm meshing with said first mentioned gear, a shaft carried by said second gear, a frame carried by said second shaft, a universal mount for the end of said second shaft away from said second gear carried by said outstanding arm, a reciprocating tool carried by said second frame, a clamp carried by said outstanding arm to carry an object to be worked on, and means to advance said object with operation of said reciprocating tool.

7. A saw sharpening device, a main shaft, a mount for said shaft having an outstanding element, a driving gear on said shaft, a swinging arm mounted on said shaft, a second frame carried by said arm, a second shaft carried by said arm and second frame obliquely positioned in respect to said main shaft, a driven gear on one end of said second shaft meshing with said driving gear, a pinion carried by said second shaft, a rack carried by the second frame meshing with said pinion, a file carried by said rack, a universal connection between said second frame and said outstanding element at an end of said second shaft removed from said driven gear, a holder for said saw to present it to said file and means to oscillate said driving gear.

8. In the device of claim 7, said second shaft having an extension to beyond said universal connection to set the saw.

9. In the device of claim 7, a pawl to advance the saw, one tooth after each application of the file.

10. In the device of claim 7, clamping jaws and means to cause said jaws to grip said saw when the file is applied.

11. A saw sharpening device comprising a fixed carrier for a saw, an oscillating carrier for a file to be drawn across the teeth of the saw, and means to actuate said carrier carrying said file to cause it successively to move said file across two of said teeth at an oblique angle to the blade of said saw, to lift said file from said teeth at the end of said movement or stroke, to move said file after it has been lifted so that it will be in position to be presented to the teeth of the saw at the beginning of another stroke, to change the angle of the file during said lifting so that it will move across two teeth of said saw at an opposite angle and to move said file against said teeth and cause it to take a stroke at said opposite angle, said last mentioned means including a main fixed frame supporting said first mentioned carrier, a swinging secondary frame supporting said secondary carrier rotatably mounted on said main frame to oscillate in respect to said main frame and said last-mentioned means including a pair of meshing bevelled gears carried by said respective frames controlling said oscillating movement, the bevel gear on said secondary frame being provided with a shaft, a pinion on said shaft and a reciprocating rack carried by said swinging frame actuated by said pinion, said carrier being attached to said rack.

ERNEST J. CEDERBERG.